United States Patent [19]

McCall et al.

[11] 3,910,928
[45] Oct. 7, 1975

[54] 3-(CYANIMINO)-PROPIONITRILES

[75] Inventors: John M. McCall; Joseph J. Ursprung, both of Kalamazoo, Mich.

[73] Assignee: The Upjohn Company, Kalamazoo, Mich.

[22] Filed: Apr. 26, 1974

[21] Appl. No.: 464,476

[52] U.S. Cl..... 260/293.51; 260/239 A; 260/239 E; 260/239 B; 260/247.5 R; 260/256.4 N; 260/268 CN; 260/326.62; 260/464; 260/465 E; 260/465.5 R; 424/251
[51] Int. Cl.² .................................. C07D 295/14
[58] Field of Search ........ 260/239 A, 239 E, 239 B, 260/247.5 R, 256.4 N, 268 CN, 326.62, 464, 465 E, 465.5 R, 293.51

[56] References Cited
UNITED STATES PATENTS
3,461,461  8/1969  Anthony et al. ............... 260/256.4

*Primary Examiner*—G. Thomas Todd
*Attorney, Agent, or Firm*—Martin B. Barancik; Roman Saliwanchik

[57] ABSTRACT

A method for preparing 6-amino-5-$R_3$-2,4-diaminopyrimidine-3-oxides which comprises:

a. O-alkylating an $R_3$-substituted 2-cyanoacetamide

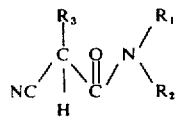

in the presence of an inert organic solvent, thereby forming an enol ether

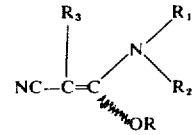

where R is the alkyl from the alkylating agent, b. reacting said enol ether with cyanamide in an inert solvent, thereby forming a 2-$R_3$-3-(cyanimino)-3-$NR_1R_2$-propionitrile

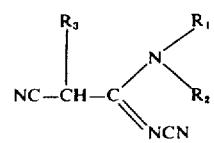

c. reacting the 2-$R_3$-3-(cyanimino)-3-$NR_1R_2$-propionitrile with a hydroxylamine salt and base, thereby forming the 6-amino-5-$R_3$-substituted-2,4-diaminopyrimidine-3-oxide

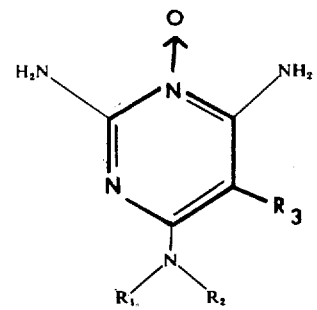

11 Claims, No Drawings

3-(CYANIMINO)-PROPIONITRILES

BACKGROUND OF THE PRIOR ART

Triamino pyrimidine N-oxides are known in the art. U.S. Pat. No. 3,461,461 specifically discloses and claims certain 6-amino-4-(substituted amino)-1,2-dihydro-1-hydroxy-2-iminopyrimidines. These compounds have various utilities, according to U.S. Pat. No. 3,461,461, such as forming salts with mothproofing agents, aiding in the formation of pickling inhibitors, and pharmaceutical uses, particularly anti-hypertensive effects.

The compounds which comprise the subject matter of U.S. Pat. No. 3,461,461 will herein be referred to as the N-oxide tautomers. The numbering of the pyrimidine ring system will be changed to conform to that adopted recently by Chemical Abstracts, i.e., compounds of U.S. Pat. No. 3,461,461 will be named as 2,-4-diamino-6-amino-pyrimidine-3-oxides.

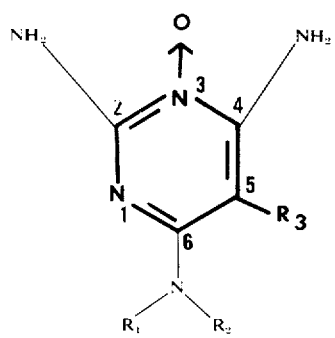

A method of preparing these compounds is disclosed in U.S. Pat. No. 3,461,461, see Column 5, line 15 to Column 7, line 10 of the patent. an alkyl cyano acetate is reacted with guanidine in the presence of a strong base to give a 2,4-diamino-6-hydroxypyrimidine. This product is then reacted with phosphorous oxychloride to give a 2,4-diamino-6-chloropyrimidine. An alternative method of synthesizing the latter compound is the reaction of barbituric acid with phosphorous oxychloride to give 2,4,6-trichloropyrimidine which in turn is reacted with ammonia to give the 2,4-diamino-6-chloropyrimidine. The 6-chloro compound is then reacted with a phenoxide salt of a phenol unsubstituted or substituted with up to three halo atoms. The 6-phenoxysubstituted pyrimidine prepared in this manner is isolated and oxidized with a percarboxylic acid such as a substituted perbenzoic acid, thereby forming the 2,4-diamino-6-phenoxy-substituted pyrimidine-3-oxide. This compound is then converted to the 6-amino substituted desired compounds by reaction with XH where X is the desired amino functionality. An alternative route follows the above sequence except that the 6-chloropyrimidine is isolated and converted to the corresponding N-oxide prior to nucleophilic displacement of the chloro by the phenoxy. These methods are somewhat cumbersome and potentially hazardous.

A new method of synthesizing triamino pyrimidine N-oxide derivatives is now disclosed. Specifically a method of synthesizing 6-amino-5-optionally substituted-2,4-diamino-pyrimidine-3-oxides has been discovered which significantly decreases the cost and hazard of previous preparations.

BRIEF SUMMARY OF THE INVENTION

An $R_3$ substituted 2-cyanoacetamide (FIG. I)

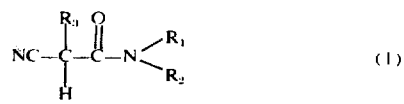

is O-alkylated in the presence of an inert organic solvent forming an enol ether (FIG. II)

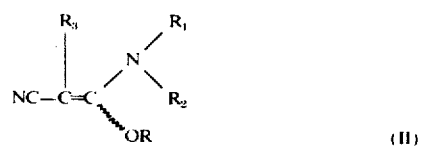

where R is the alkyl from the alkylating agent, said enol ether is reacted with cyanamide in an alcoholic solvent to form a 2-$R_3$-3-(cyanimino)-3-$NR_1R_2$ propionitrile (FIG. III)

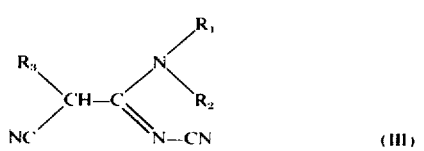

which is reacted with hydroxylamine and base, thereby forming the 6-amino-5-optionally substituted-2,4-diaminopyrimidine-3-oxide (FIG. IV)

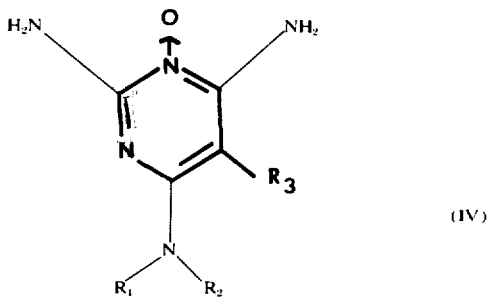

wherein $R_1$ and $R_2$ are the same or different and are selected from the group consisting of hydrogen, alkyl of one to ten carbon atoms, inclusive, alkenyl of two to ten carbon atoms, inclusive, cycloalkyl of five to eight carbon atoms, inclusive, unsubstituted or substituted with one to three alkyl groups, said alkyl having from one to three carbon atoms, inclusive, alkyl being the same or different if two or three alkyl groups, and phenylalkyl with alkyl of one to six carbon atoms, inclusive, and $R_1$ and $R_2$, when taken together with the nitrogen atom to which they are attached form a heterocyclic ring of three to seven carbon atoms, morpholino, piperazino, and N-alkylpiperazino, where alkyl is from one to three carbon atoms, inclusive, each of the rings having attached as substituents on carbon atoms thereof zero to three alkyl groups, inclusive, said alkyl being the same or different, if two or more alkyl group substituents, and having from one to three carbon atoms, inclusive; $R_3$ is selected from the group consisting of hydrogen, alkyl of one to six carbon atoms, inclusive, alkenyl of two to six carbon atoms, inclusive, cycloalkyl of five to eight carbon atoms, substituted or unsubstituted with one to three alkyl groups, said alkyl group having from one to three carbon atoms, inclusive, alkyl being the same or different if two or three alkyl groups, and phenylalkyl wherein alkyl is from one to six carbon atoms, inclusive.

Further aspects of the invention include the conversion of the enol ether to the propionitrile and the conversion of the propionitrile to the substituted pyrimidine-3-oxide by the processes of this application.

A still further aspect of the invention is the propionitrile intermediate.

DETAILED DESCRIPTION OF THE INVENTION

The compounds prepared by the process of this invention (IV) can also exist in tautomeric forms, FIGS. IVa and IVb.

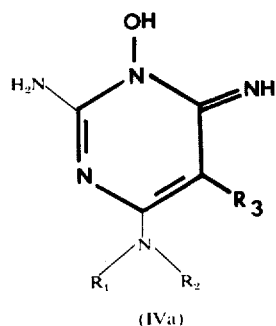

(IVa)

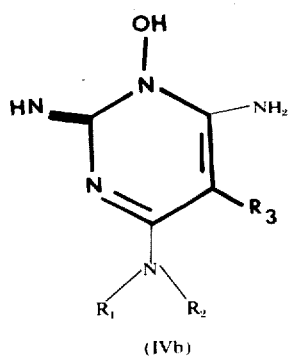

(IVb)

For convenience, the compounds will be referred to hereinafter only in their FIG. IV form. However, it is to be understood that the compounds prepared by the process of this invention are likely to be mixtures of tautomeric forms, the compositions of which are dependent on such factors as the nature of $R_1$, $R_2$ and $R_3$ and the environment. In some instances, one form or another may predominate.

The propionitrile of FIG. III can exist in a tautomeric form as the acrylonitrile, FIG. V below:

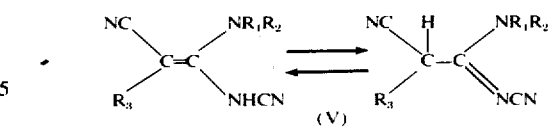

(V)

The exact form of the compound will depend upon the particular substituents and the environment in which the compound exists. For example, when $R_3$ is hydrogen and

is piperidine, the crystalline form of the compound exists as the propionitrile.

Examples of alkyl of one to ten carbon atoms, inclusive, are methyl, ethyl, propyl, butyl, pentyl, hexyl, octyl, nonyl, decyl and isomers thereof. Examples of alkenyl of two to ten carbon atoms thereof are ethylene, propylene, butylene, pentylene, hexylene, heptylene, octylene, nonylene, and decylene and isomers thereof. By isomers thereof, we mean isomers of the hydrocarbon and different positions of the double bond. Cycloalkyl of five to eight carbon atoms, inclusive, are cyclopentyl, cyclohexyl, cycloheptyl, and cyclooctyl.

Examples of alkyl substituted cycloalkyl are 3-methylcyclopentyl, 2,4-diethylcyclohexyl, 2-methyl-4-propylcycloheptyl, 5-isopropylcylooctyl, 2,4-dimethyl-5-ethylcyclohexyl, and 4,4-dimethylcyclohexyl. Phenylalkyl with alkyl of one to six carbon atoms, inclusive, are benzyl, phenylethyl, phenylpropyl, phenylbutyl, phenylpentyl, phenylhexyl and isomers thereof. By isomers thereof is meant isomers of the alkyl function and various positions of the phenyl on the alkyl.

The $R_3$ substituted cyanoacetamide starting material of this process can be conveniently prepared by known processes. For example, an appropriately $R_3$ substituted cyano acetic acid ester (FIG. VI)

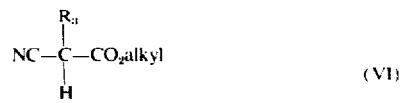

(VI)

can be reacted with the desired $R_1R_2$ substituted amine (FIG. VII)

(VII)

Compounds illustrative of VI are the following:

ethyl 2-methyl-2-cyanoacetate
ethyl 2-cyclohexyl-2-cyanoacetate
ethyl 2-cyanoacetate
ethyl 2-(1-butyl)-2-cyanoacetate
ethyl 2-benzyl-2-cyanoacetate
ethyl 2-(1-methylbenzyl)-2-cyanoacetate
ethyl 2-(2-methyl-2-phenylethyl)-2-cyanoacetate
ethyl 2-(2-propylene)-2-cyanoacetate A convenient method of preparing the 2-cyano-2-$R_3$ acetic acid ester is through the base induced reaction of $R_3Y$ with ethyl-2-cyanoacetate, where $R_3Y$ is an alkylating reagent and Y is halogen or sulfate.

The 2-cyano-2-$R_3$ substituted acid amide is then O-alkylated by an appropriate reagent at suitable conditions. For example, a trialkyloxonium fluoroborate or an alkyl fluorosulfonate can be used. Furthermore, an alkyl sulfate such as dimethylsulfate can also be employed. The alkyl functionality of the reactant which enters the enol ether of FIG. II as R is not of great importance, since it leaves the molecule in the next reaction step and is not found in the desired product. Consequently, the number of carbon atoms in the alkyl grouping R is not unduly significant. An eight carbon atom alkyl group can be used, preferably no more than four carbon atoms. When using a fluoroborate or fluorosulfonate the methyl or ethyl alkyl group are preferred, particularly the methyl. After alkylation using the alkyl fluoroborate or fluorosulfonate, the reaction mixture is neutralized with a variety of bases, i.e., potassium carbonate, pyridine, and sodium methoxide, depending on the alkylating reagent and reaction solvent.

A further reactant which can be employed to prepare the enol ether is a lower dialkyl sulfate such as dimethyl sulfate. This can be in combination with a catalytic quantity of a lower alkyl fluorosulfonate, preferably where alkyl is methyl.

A solvent should be used where the two reactants do not provide sufficient solubility in each other for the reaction to proceed expeditiously. The type of solvent which can be used is an inert organic solvent in which at least one, preferably both, of the reactants are soluble. The term "inert" is used to define an organic solvent which does not adversely affect the course of the reaction. Although a polar solvent can be used, it is preferred to use non-polar solvents such as methylene chloride, chloroform, diethyl ether, tetrahydrofuran, benzene, toluene, the xylenes and the like.

The temperatures at which the O-alkylation occurs is not critical. The reaction proceeds well at 25°C. However, higher or lower temperatures can also be used with facility, for example, from about 20°C. to about 100°C., preferably from about 20° to about 50°C.

At this point, the reaction product can be reacted directly with cyanamide forming the 2-$R_3$-3-(cyanimino)-3-$NR_1R_2$ propionitrile (III). It is preferred to add a lower alcohol, for example, an alcohol having one to four carbon atoms, inclusive, as an additional solvent. The alcohol can be added to the reaction mixture containing the enol ether or to the partially purified enol-ether reaction mixture, that is, the enol ether with most of the solvent used in the ether preparation step removed.

The addition of cyanamide to the enol ether is readily carried out at 25°C. However, the reaction can be carried out at temperatures of from about 0°C. to about 100°C. with facility, preferably about 20°C. to about 60°C.

The propionitrile formed in the preceding step is then reacted with hydroxylamine or an hydroxylamine salt, for example, hydroxylamine hydrochloride, and base to form the desired 6-amino-5-optionally substituted-2,4-diamino pyrimidine-3-oxide. The propionitrile need not be separated from its constituent mixture, particularly the alcoholic solvent. If sufficient alcohol is not present, additional alcohol should be added with the hydroxylamine salt and base. The particular base employed is not unduly significant. Any base, weak or strong, can be employed in the appropriate concentration and stoichiometric quanities. Examples of bases which can be used are sodium hydroxide, potassium hydroxide, potassium carbonate, sodium acetate, triethylamine, and pyridine. Preferred bases are the relatively mild bases, for example, salts of weak acids or potassium carbonate.

The temperature at which this last reaction can be conducted is from about 0° to the reflux temperature of the alcoholic solvent, preferably about 20° to about 60°C. The reaction is readily carried out at 25°C.

The pyrimidine-3-oxides made by the process of this invention are recovered from solution by ordinary chromatographic, extraction, or crystallization methods.

The pharmaceutically acceptable acid addition salts are readily prepared by reacting the pyrimidine-3-oxide at standard conditions with the proper equivalents of the acid. The mono, di, or tri acid addition salts, or mixtures thereof, are prepared in this manner. Examples of suitable pharmaceutically acceptable acid addition salts are the salts of sulfuric, nitric, hydrochloric, hydrobromic, phosphoric, acetic, benzoic, salicylic, glycolic, succinic, nicotinic, tartaric, maleic, malic, pamoic, methanesulfonic, cyclohexanesulfamic, picric, lactic acids, and the like.

EXAMPLE 1

6-Piperidino-2,4-diaminopyrimidine-3-oxide

A solution of 11.44 g. (0.0753 mole) of N-(2-cyanoacetyl)piperidine and 10.95 g. (0.0739 mole) of trimethyloxonium fluoroborate in 120 ml. of dry methylene chloride is stirred at 25°C. for twenty-four hours under nitrogen. The supply of trimethyloxonium fluoroborate is obtained directly from reaction of methyl ether, epichlorohydrin, and $BF_3$.etherate. After the reaction is complete, a solution of 11.0 g. $K_2CO_3$ in 11 ml. $H_2O$ is added slowly. The reaction mixture is stirred for thirty minutes. The organic phase is decanted from the white coagulate and poured into 50 ml. of 10% $K_2CO_3$ in $H_2O$. The residue is washed several times with methylene chloride and the organic phases combined. The organic phase is partitioned against the 10% aqueous $K_2CO_3$, dried by passage over anhydrous $K_2Co_3$, and concentrated in vacuo. The concentrate is dissolved in 60 ml. of absolute ethanol. A 19 ml. (0.0234 mole) aliquot is removed. To this is added 1.0 g. (0.0238 mole) of cyanamide. The reaction mixture is stirred at 25°C. for six hours under nitrogen. Then, 6.79 g. (0.0492 mole) of $K_2CO_3$, 2.57 g. (0.0369 mole) of hydroxylamine hydrochloride, and 30 ml. of absolute ethanol are added and the mixture stirred at 25°C. for 16 hours. The reaction mixture is coated onto silica gel by evaporating the solvent. The adsorbate is chromatographed on silica gel to give 2.10 g. (43%) of crystalline product. This recrystallized from methanol $CH_3CN$ by dissolving the product in a minimum volume of methanol and concentrating while adding acetonitrile until clouding begins. A yield of 1.70 g. (35% recrystallized material, decomp. ca. 260° is obtained.

Analysis Calcd. for: $C_9H_{15}N_5O$: C, 51.66; H, 7.22; N, 33.47. Found: C, 51.37; H, 7.17; N, 33.69.

EXAMPLE 2

6-Ethylamino-2,4-diaminopyrimidine-3-oxide

This compound is prepared in the same manner as the compound of Example 1. 6.80 g. (0.0667 mole) of N-ethyl-2-cyanoacetamide and 9.87 g. (0.0667 mole) trimethyloxonium fluoroborate are stirred at 25°C. in 100 ml. $CH_2Cl_2$ for sixteen hours. A solution of 10 g. $K_2CO_3$ in 10 ml. $H_2O$ is added slowly. After the normal workup procedure of Example 1, 2.80 g. (0.0667 mole) of cyanamide and 30 ml. of dry ethanol are added to the enol ether.. After six hours, 6.95 g. (0.1005 mole, 1.5 equivalents) of hydroxylamine hydrochloride and 13.81 g. (0.1005 mole) of $K_2CO_3$ and 50 ml. of dry ethanol are added. The mixture is stirred at 25°C. for sixteen hours. After concentrating this mixture, it is chromatographed on silica gel to give 5.53 g. (49.0%) crystalline product. This is recrystallized from MeOH/$CH_3$CN to give 3.60 g., decomp. 271°. Another recrystallization from MeOH/$CH_3$CN gives 3.20 g., decomp. 275°.

Analysis Calcd. for: $C_6H_{11}N_5O$: C, 42.59; H, 6.50; N, 41.40. Found: C, 42.91; H, 6.49; N, 41.36.

EXAMPLE 3

6-n-Decylamino-2,4-diaminopyrmidine-3-oxide

This compound is prepared in the same manner as the compound of Example 1. 12.95 g. (0.0578 mole) of N-(n-decyl)-2-cyanoacetamide is reacted with 8.56 g. (0.0578 mole) trimethyloxonium fluoroborate at 25°C. After twenty-eight hours a solution of 9 g. of $K_2CO_3$ and 9 ml. of water is added and stirred for thirty minutes. The enol ether is isolated in the usual manner. To the resultant oil, 2.43 g. (0.0578 mole) of cyanamide and 40 ml. of ethanol are added. After nine hours, 6.02 g. (0.0867 mole, 1.5 equivalents) of hydroxylamine hydrochloride, 9.47 g. (0.116 mole, 2.0 equivalents) of potassium carbonate, and 50 ml. of dry ethanol are added. This is stirred for sixteen hours, concentrated, and chromatographed on silica gel to give 7.51 g. of the pyrimidine. This is recrystallized from hot $CH_3$CN/MeOH to give 5.60 g. (34%) of product, m.p. 118°.

Analysis Calcd. for: $C_{14}H_{27}N_5O$: C, 59.75; H, 9.67; N, 24.73. Found: C, 60.15; H, 9.56; N, 24.73.

EXAMPLE 4

6-n-Butylamino-2,4-diaminopyrimidine-3-oxide

This compound is prepared in the same manner as the compound of Example 1. A mixture of 8.65 g. (0.0617 mole) of N-(n-butyl)-2-cyanoacetamide and 8.35 g. (0.0564 mole) of trimethyloxonium fluoroborate in 80 ml. of dry $CH_2Cl_2$ is stirred under nitrogen for four hours at 25°C. A solution of 9 g. of $K_2CO_3$ in 9 ml. of water is slowly added and stirred for thirty minutes. The enol ether product is then isolated in a manner similar to the Example 1 workup. To the resultant oil is added 2.13 g. (0.050 g., 0.9 equivalents) of cyanamide and 20 ml. of dry ethanol. This is stirred 1.6 hours under nitrogen. Then 6.95 g. (0.10 mole) of hydroxylamine hydrochloride, 12.30 g. (0.15 mole) of sodium acetate, and 20 ml. of dry ethanol are added. This is stirred for seventeen hours. The reaction mixture is diluted with 300 ml. of water and continuously extracted with $CH_2Cl_2$. The extract is chromatographed on Florasil. The product is crystallized from hot $CH_3$CN/methanol to give 5.0 g. (45% yield) crystalline product. This is recrystallized twice more to give material with m.p. 221°–222.5°.

Analysis Calcd. for: $C_8H_{15}N_5O$: C, 48.71; H, 7.66; N, 35.51. Found: C, 49.00; H, 7.73; N, 36.16.

EXAMPLE 5

6-Cyclohexylamino-2,4-diaminopyrimidine-3-oxide

This compound is prepared in the smae manner as the compound of Example 1. A mixture of 9.90 g. (0.0596 mole) of N-cyclohexyl-2-cyanoacetamide and 8.83 g. (0.0596 mole) of trimethyloxonium fluoroborate in 80 ml. of dry $CH_2Cl_2$ is stirred under nitrogen for 3.25 hours. A solution of 10 g. of $K_2CO_3$ in 10 ml. of water is added slowly and the mixture stirred for thirty minutes. The product is isolated as in Example 1. To the resultant oil, 2.25 g. (0.0536 mole, 0.9 equivalents) of cyanamide and 30 ml. of absolute ethanol are added. After stirring under nitrogen for 2.5 hours, 4.2 g. (0.060 mole) of hydroxylamine hydrochloride, 8.2 g. (0.100 mole) of sodium acetate, and 30 ml. of dry ethanol are added. This mixture is stirred for fifteen hours. The reaction mixture is diluted with 150 ml. of wter and continuously extracted with $CH_2Cl_2$. The extract is concentrated and chromatographed on silica gel to give 8.29 g. (62% yield) crystalline product. This is crystallized from boiling $CH_3$CN/MeOH to give a first crop of 5.75 g., m.p. 218°–220°C, (43% yield).

Analysis Calcd. for: $C_{10}H_{17}N_5O$: C, 53.79; H, 7.68; N, 31.37. Found: C, 53.50; H, 8.07; N, 31.08.

EXAMPLE 6

6-(N,N-Dicyclohexylamino)-2,4-diaminopyrimidine-3-oxide

A mixture of 4.55 g. (0.0183 mole) of N-(2-cyanoacetyl)-N,N-dicyclohexylamine and 3.25 g. (0.0219 mole) trimethyloxonium fluoroborate in 50 ml. of methylene chloride is stirred under nitrogen at room temperature. After 24.5 hours, a solution of 4.0 g. potassium carbonate in 4.0 ml. water is added. The mixture is stirred for thirty minutes. The organic phase is decanted and the combined organics are washed with 10% aqueous potassium carbonate solution. After drying over potassium carbonate, the organic phase is concentrated in vacuo. A solution of 1.20 g. cyanamide in 15 ml. of dry ethanol is added to the resultant oil. After stirring 40 hours, 3.82 g. (0.054 mole) hydroxylamine hydrochloride and 6.00 g. (.073 mole) potassium carbonate are added. After stirring 68 hours the reaction mixture is chromatographed on silica gel to give 6.84 g. of crystalline product which is recrystallized from methanol/acetonitrile to give 2.75 g. (57%) of the product.

Analysis Calcd. for: $C_{16}H_{17}N_5O \cdot 1.4H_2O$: C, 58.12; H, 8.95; N, 21.18. Found: C, 58.08; H, 8.52; N, 21.53.

EXAMPLE 7

6-(N,N-Di-n-butyl)-2,4-diaminopyrimidine-3-oxide

A mixture of 7.14 g. (.0364 mole) of N-(2-cyanoacetyl)-N,N-di-n-butylamine and 6.47 g. (.0437 mole) trimethyloxonium fluoroborate in 80 ml. of methylene chloride is stirred for 7½ hours. A solution of 7 g. of potassium carbonate in 7 ml. of water is added. After stirring thirty minutes, the organic phase is decanted. The residue is washed with methylene chloride. The combined organics are washed with 10% aqueous potassium carbonate and dried over potassium carbonate. The solution is concentrated in vacuo. A mixture of 1.53 g. (.0364 mole) cyanamide in 20 ml. of ethanol is added. After sixteen hours, 3.79 g. (0.0546 mole) of hdyroxylamine hydrochloride and 5.97 g. (0.0728 mole) of potassium carbonate is added. The mixture is stirred for forty-eight hours. Chromatography on silica gel gives 2.15 g. (23%) crystalline product which is recrystallized from methanol/acetonitrile, m.p. 186.5°–188°.

Analysis Calcd. for: $C_{12}H_{23}N_5O$: C, 56.89; H, 9.15; N, 27.65. Found: 56.89; H, 9.24; N, 27.65.

EXAMPLE 8

6-(N-Methylamino)-2,4-diaminopyrimidine-3-oxide

This compound is prepared in the same manner as the compound of Example 1. A mixture of 12.00 g. (0.122 mole) N-methyl-2-cyanoacetamide and 23.53 g. (0.159 mole) trimethyloxonium fluoroborate in 60 ml. of methylene chloride is stirred for sixteen hours. A solution of 20 g. potassium carbonate in 20 ml. of water is added slowly. After the workup cited in Example 1, 6.13 g. (0.146 mole) cyanamide and 40 ml. of dry ethanol are added to the enol ether. After stirring ten hours 12.72 g. (0.183 mole) of hydroxylamine hydrochloride, 20.0 g. (0.244 mole) of potassium carbonate, and 40 ml. of ethanol are added. This mixture is stirred under nitrogen for four days. The mixture is concentrated in vacuo and chromatographed on silica gel to give 14.7 g. (78%) crystalline 6-(N-methylamino)-2,4-diaminopyrimidine-3-oxide, decomp. 188°.

EXAMPLE 9

6-Piperidino-2,4-diaminopyrimidine-3-oxide

A solution of 50.0 g. (0.329 mole) of N-(2-cyanoacetyl)-piperidine and 37.5 g. (0.329 mole) of methyl fluorosulfonate in 200 ml. methylene chloride is stirred at 25° under nitrogen for seventy-two hours. The reaction mixture is slowly poured into a stirred solution of 50 g. potassium carbonate in 150 ml. of water. After thirty minutes, the organic phase is decanted. The residue is washed with methylene chloride. The combined organic phases are washed quickly with 10% aqueous potassium carbonate and dried over potassium carbonate. Methylene chloride is removed in vacuo. A solution of 13.82 g. (0.329 mole) of cyanamide in 200 ml. dry ethanol is added to the oil. After six hours, 22.86 g. (0.329 mole) of hydroxylamine hydrochloride and 45.4 g. (0.329 mole) of potassium carbonate are added. The mixture is mechanically stirred under nitrogen for sixty-three hours. The reaction is concentrated to about 100 ml., 60 g. of silica gel is added, and the mixture is further concentrated. Chromatography of the above mixture on silica gel gives 21.9 g. (32%) crystalline 6-piperidino-2,4-diaminopyrimidine-3-oxide. A 17 g. portion is recrystallized from methanol-/acetonitrile to give 14.0 g. product.

In an alternative workup of the reaction of methyl fluorosulfonate and N-(2-cyanoacetyl)-piperidine, an equivalent of sodium methoxide in methanol is added to the reaction mixture. The enol ether is decanted from the precipitated sodium fluorosulfonate. The organic phase is concentrated and reacted directly with cyanamide in an alcohol solvent. The rest of the synthesis is similar to Example 9. Comparable yields are obtained using this variation.

EXAMPLE 10

5-Methyl-6-piperidino-2,4-diaminopyrimidine-3-oxide

A mixture of 13.16 g. (0793 mole) of N-(2-cyano-2-methylacetyl)-piperidine and 11.74 g. (0.0793 mole) of trimethyloxonium fluoroborate in 100 ml. of methylene chloride is stirred under nitrogen at room temperature. After forty-eight hours, 17 g. of 25% sodium methoxide in methanol is added. The mixture is stirred for thirty minutes. The organic phase is filtered and concentrated. A solution of 3.33 g. of cyanamide and 10.94 g. of potassium carbonate in 50 ml. of dry ethanol is added to the resultant oil. After stirring seventy-two hours, 5.51 g. (.0793 mole) of hydroxylamine hydrochloride is added. After stirring seventy-two hours, the reaction mixture is chromatographed on silica gel to give 2.27 g. of a yellow oil which gives a strong ferric chloride test and an nmr consistent with the product structure.

EXAMPLE 11

6-Pyrrolidino-2,4-diaminopyrimidine-3-oxide

A mixture of 5.00 g. (0.0362 mole) of N-(2-cyano-2-acetyl)-pyrrolidine and 5.35 g. (0.0362 mole) of trimethyloxonium fluoroborate in 120 ml. of methylene chloride is stirred under nitrogen at room temperature. After twenty-four hours, a solution of 5.4 g. potassium carbonate in 5.4 ml. water is added. The mixture is stirred for thirty minutes. The organic phase is decanted and the combined organics are washed with 10% aqueous potassium carbonate solution. After drying over potassium carbonate, the organic phase is concentrated in vacuo. A solution of 1.25 g. cyanamide in 100 ml. of dry ethanol is added to the resultant oil. After stirring nineteen hours, 2.07 g. (0.0298 mole) hydroxylamine hydrochloride and 4.12 g. (0.0298 mole) potassium carbonate are added. After stirring thirty hours, the reaction mixture is chromatographed to give 3.28 g. crystalline product which is recrystallized from methanol/acetonitrile to give 1.90 g. (33%) of the product.

Analysis Calcd. for: $C_8H_{13}N_5$: C, 49.22; H, 6.71; N, 35.88. Found: C, 49.65; H, 6.68; N, 36.37.

EXAMPLE 12

3-Cyanimino-3-piperidinopropionitrile

A mixture of 5.00 g. (0.0329 mole) of N-(2-cyanoacetyl)-piperidine and 5.00 g. (0.0338 mole) of trimethyloxonium fluoroborate in 50 ml. of methylene chloride is stirred at 25° under nitrogen for twenty-three hours. A solution of 5.0 g. potassium carbonate in 5.0 ml. water is added, the mixture is stirred for thirty minutes and the organic phase decanted from the precipitated salts. After washing with 10% aqueous potassium carbonate solution, the organic phase is dried over potassium carbonate and concentrated in vacuo. A solution of 1.38 g. (0.0329 mole) of cyanamide is added to the resultant yellow oil. After five hours this solution is concentrated in vacuo. The product mixture is chromatographed on silica gel to afford 2.12 g. of pure 3-cyanimino-3-piperidinopropionitrile, m.p. 73°–74.5°.

Analysis Calcd. for: $C_9H_{12}N_4$: C, 61.34; H, 6.87; N, 31.79. Found: C, 61.66; H, 7.04; N, 31.27. nmr (CDCl$_3$) τ: 6.07 (2H, sharp sing, —CH$_2$—), 6.09–6.52 (4H, m, N(CH$_2$)$_2$), 8.25 (br sing 3H, (—CH$_2$—)$_3$).

EXAMPLE 13

In a manner similar to the process of Examples 1–11, but starting with the following amides of 2-cyanoacetic acid:

N-methyl ethyl
N-propyl butyl
N-hexyl octyl
N-isobutyl methyl
N-heptyl
N-methyl ethylene
N-butyl propylene
N-3-heptylene-3-butylene
N-pentyl-2-isohexylene
N-4,4-dimethylcyclohexyl
N-cyclopentyl
N-3-methylcyclopentyl
N-cyclohexyl ethyl
N-3,5-diethylcycloheptyl
N-cyclooctyl
N-cycloheptyl-2-butylene
N-2-phenylbutyl
N-3-phenylpentyl
N-3-phenylbutyl methyl
N-dibenzyl
N-2-phenylpentyl
N-2-phenylethyl cyclohexyl
N-1-phenylpropyl-2-isobutenyl
azetidinyl
pyrrolidino
hexahydroazepinyl
heptamethylenimino
morpholino
piperazino
N-methylpiperazino
2-methylazetidinyl
3-ethylpyrrolidino
2,4-dimethylpiperidino
3-ethyl-5-propylhexahydroazepinyl
2-methyl-3-ethyl-5-isopropylheptamethylenimino
3-methylmorpholino
3,5-dipropylpiperazino
N,3-diethylpiperazino the respective 6-amino-2,4-diaminopyrimidine-3-oxide compounds are formed:

6-(N-methyl-N-ethyl)amino-2,4-diaminopyrimidine-3-oxide
6-(N-propyl-N-butyl)amino-2,4-diaminopyrimidine-3-oxide
6-(N-hexyl-N-octyl)amino-2,4-diaminopyrimidine-3-oxide
6-(N-isobutyl-N-methyl)amino-2,4-diaminopyrimidine-3-oxide
6-(N-heptyl)amino-2,4-diaminopyrimidine-3-oxide
6-(N-methyl-N-ethylene)amino-2,4-diaminopyrimidine-3-oxide
6-(N-butyl-N-propylene)amino-2,4-diaminopyrimidine-3-oxide
6-(N-3-heptylene-N-2-butylene)amino-2,4-diaminopyrimidine-3-oxide
6-(N-pentyl-N-2-isohexylene)amino-2,4-diaminopyrimidine-3-oxide
6-(N-4,4-dimethylcyclohexyl)amino-2,4-diaminopyrimidine-3-oxide
6-(N-cyclopentyl)amino-2,4-diaminopyrimidine-3-oxide
6-(N-3-methylcyclopentyl)amino-2,4-diaminopyrimidine-3-oxide
6-(N-cyclohexyl-N-ethyl)amino-2,4-diaminopyrimidine-3-oxide
6-(N-3,5-diethylcycloheptyl)amino-2,4-diaminopyrimidine-3-oxide
6-(N-cyclooctyl)amino-2,4-diaminopyrimidine-3-oxide
6-(N-cycloheptyl-N-2-butylene)amino-2,4-diaminopyrimidine-3-oxide
6-(N-2-phenylbutyl)amino-2,4-diaminopyrimidine-3-oxide
6-(N-3-phenylpentyl)amino-2,4-diaminopyrimidine-3-oxide
6-(N-3-phenylbutyl-N-methyl)amino-2,4-diaminopyrimidine-3-oxide
6-(N,N-dibenzyl)amino-2,4-diaminopyrimidine-3-oxide
6-(N-2-phenylpentyl)amino-2,4-diaminopyrimidine-3-oxide
6-(N-cyclohexyl-N-2-phenylethyl)amino-2,4-diaminopyrimidine-3-oxide
6-(N-2-isobutenyl-N-1-phenylpropyl)amino-2,4-diaminopyrimidine-3-oxide
6-azetidino-2,4-diaminopyrimidine-3-oxide
6-pyrrolidino-2,4-diaminopyrimidine-3-oxide
6-hexahydroazepino-2,4-diaminopyrimidine-3-oxide
6-heptamethylenimino-2,4-diaminopyrimidine-3-oxide
6-morpholino-2,4-diaminopyrimidine-3-oxide
6-piperazino-2,4-diaminopyrimidine-3-oxide
6-N-methylpiperazino-2,4-diaminopyrimidine-3-oxide
6-(2-methylazetidino)-2,4-diaminopyrimidine-3-oxide
6-(3-ethylpyrrolidino-2,4-diaminopyrimidine-3-oxide
6-(2,4-dimethylpiperidino)-2,4-diaminopyrimidine-3-oxide
6-(3-ethyl-5-propylhexahydroazepino)-2,4-diaminopyrimidine-3-oxide
6-(2-methyl-3-ethyl-5-isopropylheptamethylenimino)-2,4-diaminopyrimidine-3-oxide
6-(3-methylmorpholino)-2,4-diaminopyrimidine-3-oxide
6-(3,5-dipropylpiperazino)-2,4-diaminopyrimidine-3-oxide
6-(N-3-diethylpiperazino)-2,4-diaminopyrimidine-3-oxide

EXAMPLE 14

In a manner similar to the processes of Examples 1–11 but starting with N-[(2-R$_3$-2-cyano)acetyl]piperidine wherein R$_3$ is the following:

R$_3$ Substitution methyl
ethyl
ethenyl
propyl
isopropyl
butyl
1-isobutenyl
t-butyl
pentyl
isoamyl
hexyl
3-hexenyl
cyclopentyl 3,4-diethylcyclopentyl
cyclohexyl
2-methylcyclohexyl
4,4-dimethylcyclohexyl
cycloheptyl
cyclooctyl
benzyl
phenylethyl
2-phenylpropyl
3-phenylisobutyl
1-phenylpentyl
3-phenylhexyl the respective 6-piperidino-5-$R_3$-substituted-2,4-diaminopyrimidine-3-oxide compounds are formed:

6-piperazino-5-methyl-2,4-diaminopyrimidine-3-oxide
6-piperidino-5-ethyl-2,4-diaminopyrimidine-3-oxide
6-piperidino-5-ethenyl-2,4-diaminopyrimidine-3-oxide
6-piperidino-5-propyl-2,4-diaminopyrimidine-3-oxide
6-piperidino-5-isopropyl-2,4-diaminopyrimidine-3-oxide
6-piperidino-5-butyl-2,4-diaminopyrimidine-3-oxide
6-piperidino-5-isobuten-1-yl-2,4-diaminopyrimidine-3-oxide
6-piperidino-5-t-butyl-2,4-diaminopyrimidine-3-oxide
6-piperidino-5-pentyl-2,4-diaminopyrimidine-3-oxide
6-piperidino-5-isoamyl-2,4-diaminopyrimidine-3-oxide
6-piperidino-5-hexyl-2,4-diaminopyrimidine-3-oxide
6-piperidino-5-hexen-3-yl-2,4-diaminopyrimidine-3-oxide
6-piperidino-5-cyclopentyl-2,4-diaminopyrimidine-3-oxide
6-piperidino-5-3,4-diethylcyclopentyl-2,4-diaminopyrimidine-3-oxide
6-piperidino-5-cyclohexyl-2,4-diaminopyrimidine-3-oxide
6-piperidino-5-(2-methylcyclohexyl)-2,4-diaminopyrimidine-3-oxide
6-piperidino-5-(4,4-dimethylcyclohexyl)-2,4-diaminopyrimidine-3-oxide
6-piperidino-5-cycloheptyl-2,4-diaminopyrimidine-3-oxide
6-piperidino-5-cyclooctyl-2,4-diaminopyrimidine-3-oxide
6-piperidino-5-benzyl-2,4-diaminopyrimidine-3-oxide
6-piperidino-5-phenylethyl-2,4-diaminopyrimidine-3-oxide
6-piperidino-5-(2-phenylpropyl)-2,4-diaminopyrimidine-3-oxide
6-piperidino-5-(3-phenylisobutyl)-2,4-diaminopyrimidine-3-oxide
6-piperidino-5-(1-phenylpentyl)-2,4-diaminopyrimidine-3-oxide
6-piperidino-5-(3-phenylhexyl)-2,4-diaminopyrimidine-3-oxide

EXAMPLE 15

2-$R_3$ substituted-2-cyano acetamides where the amine group of the amide linkage is any group of Example 13 and the $R_3$ substituent is any group of Example 14 are reacted according to the processes of Examples 1–11 to give the 6-amino 5-$R_3$-substituted-2,4-diaminopyrimidine-3-oxides. Illustrative examples of such preparations are the use of N-methyl-N-ethyl-2-cyano-2-methylacetamide to make 6-(N-methyl-N-ethyl)amino-5-methyl-2,4-diaminopyrimidine-3-oxide; N-cyclopentyl-2-cyano-2-butenyl acetamide to make 6-(N-cyclopentyl)-amino-5-(2-butenyl)-2,4-diaminopyrimidine-3-oxide; and N-[2-(3-phenylpentyl)-(2-cyano)acetyl]morpholine to make 6-morpholino-5-(3-phenylpentyl)-2,4-diaminopyrimidine-3-oxide.

We claim:
1. A compound of the formula

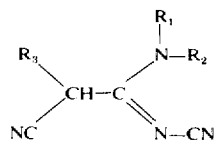

wherein
$R_1$ and $R_2$ are the same or different and are selected from the group consisting of hydrogen, alkyl of one to ten carbon atoms, inclusive, alkenyl of two to ten carbon atoms, inclusive, cycloalkyl of five to eight carbon atoms, inclusive, unsubstituted or substituted with one to three alkyl groups, said alkyl group having from one to three carbon atoms, inclusive, and further said alkyl groups being the same or different if two or three alkyl groups present, and phenylalkyl with alkyl of one to six carbon atoms, inclusive, and $R_1$ and $R_2$, when taken together with the nitrogen atom to which they are attached, form a heterocyclic ring of three to seven carbon atoms, inclusive, morpholino, piperazino, N-alkylpiperazino, where alkyl is from one to three carbon atoms, inclusive, each of the rings having attached as substituents on carbon atoms thereof zero to three alkyl groups, inclusive, said alkyl being the same or different if two or more alkyl group substituents, and having from one to three carbon atoms, inclusive, and $R_3$ is selected from the group consisting of hydrogen, alkyl of one to six carbon atoms, inclusive, alkenyl of two to six carbon atoms, inclusive, cycloalkyl of five to eight carbon atoms, inclusive, unsubstituted or substituted with one to three alkyl groups, said alkyl group having from one to three carbon atoms, inclusive, and being the same or different if two or more alkyl groups are present, and phenylalkyl wherein alkyl is from one to six carbon atoms, inclusive.

2. Compounds in accordance with claim 1 wherein $R_3$ is hydrogen.

3. A compound in accordance with claim 1 wherein $R_3$ is hydrogen and

is piperidino.

4. A compound in accordance with claim 1 wherein $R_3$ is hydrogen and

is pyrrolidino.

5. A compound in accordance with claim 1 wherein $R_3$ is methyl and

is pyrrolidino.

6. A compound in accordance with claim 1 wherein $R_3$ is methyl and

is piperidino.

7. A process for preparing a 2-$R_3$-3-(cyanimino)-3-$NR_1R_2$ propionitrile

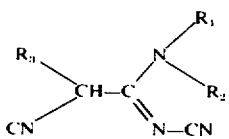

wherein $R_1$, $R_2$ and $R_3$ are defined as in claim 1 which comprises reacting with cyanamide in an inert solvent an enol ether of the formula

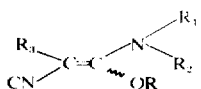

wherein R is an alkyl group of one to eight carbon atoms, inclusive, and $R_1$, $R_2$ and $R_3$ are as defined above.

8. A process in accordance with claim 7 wherein $R_3$ is hydrogen and $R_1$ and $R_2$ are the same or different and when they are the same, they are each n-butyl or cyclohexyl and when $R_1$ and $R_2$ are different, $R_1$ is hydrogen and $R_2$ is selected from the group consisting of methyl, ethyl, n-butyl, n-decyl, and cyclohexyl.

9. A process in accordance with claim 7 wherein $R_3$ is hydrogen or methyl and

is piperidino.

10. A process in accordance with claim 7 wherein $R_3$ is hydrogen.

11. A process in accordance with claim 7 wherein $R_3$ is methyl and

is pyrrolidino.

* * * * *

UNITED STATES PATENT OFFICE
CERTIFICATE OF CORRECTION

Patent No. 3,910,928　　　　　　Dated October 7, 1975

Inventor(s) John M. McCall and Joseph J. Ursprung

It is certified that error appears in the above-identified patent and that said Letters Patent are hereby corrected as shown below:

Column 1, line 38, "analkyl" should read --An alkyl--;
Column 5, line 45, "20°" should read --0°--; Column 6, line 61, "This recrystallized" should read --This is recrystallized--;
Column 7, line 12, "ether.." should read --ether.--;
Column 7, line 51, "8,65" should read --8.65--; Column 8, line 9, "smae" should read --same--; line 23, "wter" should read --water--; line 55, "$C_{16}H_{17}N_5O.1.4H_2O$" should read --$C_{16}H_{17}N_5O·1.4H_2O$--; Column 9, line 5, "hdyroxylamine" should read --hydroxylamine--; Column 11, line 58, "diaminopyrirmidine" should read --diaminopyrimidine--; Column 12, line 35, "ethylpyrrolidino-" should read --ethylpyrrolidino)- --.

Signed and Sealed this

Sixth Day of March 1979

[SEAL]

Attest:

RUTH C. MASON
*Attesting Officer*

DONALD W. BANNER
*Commissioner of Patents and Trademarks*